April 12, 1949.  E. CRAIG  2,466,794
VEHICLE SUPPORT
Filed March 15, 1946
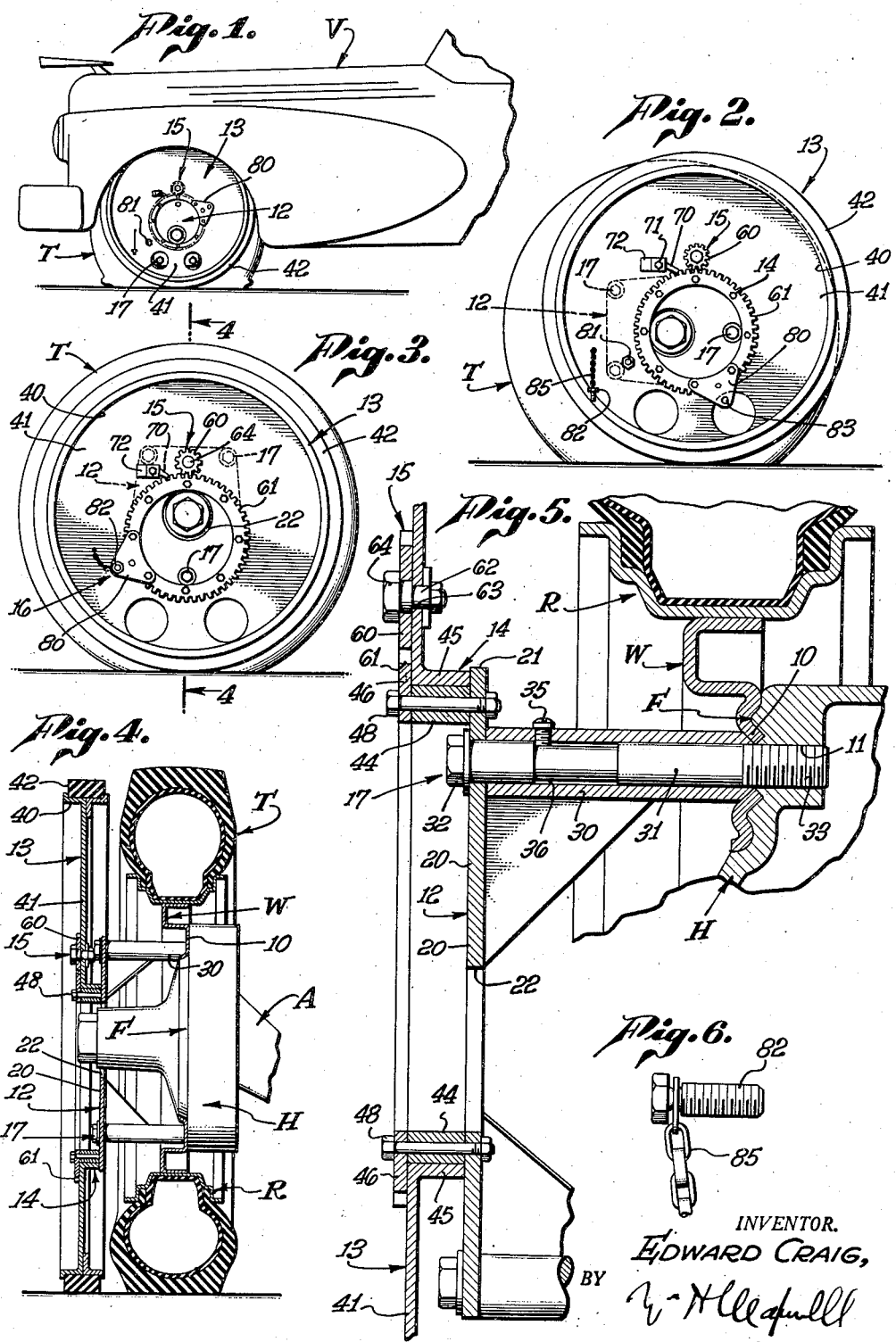
INVENTOR.
EDWARD CRAIG,
BY
ATTORNEY.

Patented Apr. 12, 1949

2,466,794

UNITED STATES PATENT OFFICE 2,466,794

VEHICLE SUPPORT

Edward Craig, Brea, Calif.

Application March 15, 1946, Serial No. 654,749

17 Claims. (Cl. 301—38)

This invention has to do with a vehicle support and is particularly concerned with a wheel support applicable to the vehicle and operable to lift the vehicle at a wheel and to provide a temporary or emergency wheel enabling the vehicle to be operated even though it may have a tire that is flat or out of repair. A general object of the present invention is to provide a device such as I have referred to which is simple, inexpensive and easily operated.

Motor vehicles are commonly equipped with pneumatic tires and when such tires become deflated it often is a difficult and bothersome task to elevate the vehicle and change the tire. The devices now commonly used for this purpose are jacks and they serve merely to lift the vehicle at the wheel that is out of repair, making it necessary to install an inflated tire in place of the one that is deflated.

It is a general object of my present invention to provide a device applicable to a vehicle wheel, for instance, to a wheel having a deflated tire and which is operable to first lift the said wheel to a normal or substantially normal position and to thereafter support it so that the vehicle can be operated or rolled at a reasonable speed and for a reasonable distance, for instance to a point where the deflated tire can be repaired or changed, making it unnecessary for this operation to be performed by the motorist on the road.

A general object of my present invention is to provide a device of the general character mentioned which is simple and inexpensive of construction. The device that I have provided involves but two principal parts and it is not only simple and inexpensive of manufacture but it is light and easily handled, making it suitable for practical use.

Another object of the invention is to provide a device of the character mentioned that is very easy to apply to a motor vehicle wheel and it is a feature of the invention that the structure is applicable to the conventional wheel construction without requiring change or modification.

The various objects and features of my invention will be fully understood from the following detailed description of a typical preferred form and application of my invention, throughout which description reference is made to the accompanying drawings, in which:

Fig. 1 is a side elevation of the forward end portion of the typical motor vehicle showing a front wheel with a deflated tire and showing the device of the present invention in position on the wheel ready to be operated. Fig. 2 is an enlarged view of the device that I have provided showing it partially operated or in the process of being operated to lift the wheel and showing the vehicle wheel partly lifted from the down position shown in Fig. 1. Fig. 3 is a view similar to Fig. 2 showing the device of my invention fully operated or in a position where the wheel has been lifted to a normal or substantially normal position, in which position the device that I have provided forms a wheel supporting the vehicle. Fig. 4 is an enlarged detailed transverse sectional view taken substantially as indicated by line 4—4 on Fig. 3. Fig. 5 is an enlarged detailed sectional view of a portion of the structure as it is shown in Fig. 4 with the parts in a different rotative position, and Fig. 6 is an enlarged fragmentary view of a part of the locking means.

The equipment of the present invention is applicable to vehicles of various types or classes, but is particularly applicable to motor vehicles such as automobiles or light trucks. For purpose of example I have shown a form of the invention suitable for passenger vehicles and have illustrated the invention as applied to such a vehicle, it being understood that the broader principles of the invention are not to be thereby construed as limited or restricted in any way.

The vehicle V illustrated in the drawings has an axle A carrying the hub H of a wheel W. The rim portion R of the wheel carries a pneumatic tire T. In accordance with conventional motor vehicle construction the hub H of the wheel has a peripheral portion with an outer face F that receives the flange 10 of the wheel W and a plurality of circumferentially spaced releasable fasteners secure the flange 10 to the face F. In the particular construction illustrated the hub has a plurality of tapped openings 11 for the reception of bolts that secure the flange 10 to the face F.

The device of the present invention involves, generally, two principal parts, one a center 12 and the other a wheel 13. The center is applicable to the wheel W of the motor vehicle and the wheel 13 is rotatably connected to the center by mounting or connecting means 14. An operating means 15 is provided for operating the wheel 13 relative to the center and a lock means 16 is provided for locking the wheel 13 against rotation relative to the center. The construction also includes means 17 for releasably connecting the center to the wheel W.

The center 12 is preferably formed of a plate 20 which is substantially round or disc-shaped, and which is adapted to be mounted so that its periphery 21 is eccentric to the wheel W of the vehicle. In practice I may provide the center plate 20 with an opening 22 to pass or receive the outer end portion of the hub H in order to allow the center plate to be arranged as close as practical to the wheel W of the vehicle.

The means 17 provided for releasably connecting the center plate with the wheel W may, in practice involve any suitable connecting means although I prefer to employ a means that utilizes, in part at least, the construction normally provided in the vehicle. In the drawings I have shown a form of connecting means 17 to be used where the fasteners connecting the flange 10 and hub H involve tapped holes in one of the parts, for instance in the hub H. The particular form of means 17 illustrated in the drawings involves guides 30 projecting from the inner side of the center plate 20 and screw members 31 carried by the guides to have heads 32 at the outer side of the plate 20 and threaded ends 33 to enter tapped openings 11 in the hub H. In the preferred construction I provide a multiplicity of units such as I have just described, for instance, several guides 30 with their screw members 31 and I space and locate these units so that to apply the center 20 to the wheel the operator removes a predetermined number, say for instance, three of the screw fasteners connecting the rim and wheel, and applies the three screw members 31 in the manner illustrated throughout the drawings so that when the members 31 have been made tight the plate 20 is mounted in a plane parallel to that of the wheel, but its periphery 21 is eccentric to the axis of the wheel. In the particular construction illustrated the screw members 31 are retained in the guides 30 by retainer pins 35 which cooperate with reduced parts 36 of the members 31 as shown in Fig. 5 of the drawings.

The wheel 13 that I have provided is preferably a simple light wheel structure involving, essentially, a rim 40 and a web 41. The rim 40 may be provided with a suitable tire or tread 42 as shown in the drawings, whereas the web 41 may be a simple, plain plate such as a body of sheet metal.

The means 14 provided to connect the wheel 13 with the center 12 or to mount the wheel on the center may vary widely in construction. In the case illustrated in the drawings I have shown an annular flange 44 projecting from the outer side of the center plate 20 near the periphery thereof and concentric with the periphery 21 of the center plate. The web 41 of the wheel 13 has an axial hub-like projection 45 which engages the flange 44 to be rotatably supported thereby. In the particular case illustrated the hub projection 45 fits over the flange 44. My construction further contemplates a retainer plate 46 on the outer part of the flange 44 to retain the hub projection 45 on the flange 44. As will be seen in Fig. 5, the hub projection 45 is retained on the flange 44 between the retainer plate 46 and the peripheral or marginal portion of the plate 20. I have shown the plate 20, flange 44 and retainer plate 46 as separate parts secured together by fastening means 48 in the form of bolts. However, it will be apparent that these parts can be arranged and related in various ways other than that illustrated.

It is important to note that the hub projection 45 on the inner side of the web 41 of the wheel and which is carried on the flange 44 of the center is located eccentric to the rim 40 of the wheel 13. It is an important feature of my invention that the eccentricity of the hub projection 45 and the eccentricity of the peripheral flange 44 of the center 12 be such, and be so related, that the wheel 13 can be positioned relative to the center 12 so that the rim 40 is located a substantial amount eccentric of the wheel W of the vehicle, or they can be related so that they together form an assembly or a wheel structure having the rim 40 concentric with the wheel of the vehicle.

The operating means 15 that I have provided is operable to move the principal elements of the device, that is the center 12 and the wheel 13, relative to each other to move them between the positions above described. In the form of the invention illustrated the operating means involves a drive pinion 60 carried by the wheel section 13 and cooperating with a gear 61 carried by the center section 12. The drive pinion 60 is carried by the web 41 of the wheel 13 and, as shown in Fig. 5, it is fixed on a pin 62 rotatable in an opening 63 in the web 41 and it has an operating head 64 at the outer side of the web 41. The head 64 may be a hexagonal head corresponding to the heads 32 above described or to a nut so that it can be readily engaged by a wrench or tool such as is commonly used to manipulate the fasteners that secure the vehicle rim to the wheel. The gear 61 is preferably a large gear arranged concentric with the flange 44 of the center 12 and in the particular case illustrated the outer or peripheral portion of the retainer flange 46 projects and is toothed to form the gear 61. In practice I make the pinion 60 small in diameter and the gear 61 rather large in diameter so that a substantial mechanical advantage is gained through this gearing, making it possible to easily turn the pinion in order to effect the desired relative movement between the wheel 13 and center 12.

In the form of the invention illustrated I have shown a safety means for checking accidental movement between the wheel 13 and center 12 in a direction opposite to that desired which means may involve a ratchet pawl 70 on a pivot pin 71 carried by a bracket 72 on the web 41 of the wheel 13.

The lock means that I have provided is intended to be engaged or put into operation when the wheel 13 is located relative to the center 12 so that the rim 40 of the wheel 13 is concentric with the wheel W of the vehicle. The particular lock means illustrated in the drawings involves a projecting bracket 80 on the center, for instance on the outer side of the retainer plate 46 of the center 12, a socket 81 in the web 41 of wheel 13 and a lock pin 82. The bracket 80 has an opening 83 that registers with the socket 81 when the wheel 13 is in the desired position relative to the center 12 and in the case illustrated the socket 81 is tapped and the lock pin 82 is a threaded pin or bolt adapted to be arranged through the opening 83 and threaded into the socket 81. When the lock pin 82 is in place it positively prevents relative rotation or movement between the wheel 13 and the center 12. In the particular form of the invention illustrated I show a short, flexible connection 85 coupling the lock pin 82 to the wheel 13 so that it cannot become misplaced.

In employing the structure that I have provided, when a tire T on a vehicle wheel is deflated as shown in Fig. 1, any ornamental hub cap is first removed in the usual manner and then a suitable number, say for instance three of the fastening means which normally serve to retain the wheel W on the hub H, are removed. The fastening means are removed so that the center 12 can be attached to the wheel W to be in what I will term an "up" position. When the center 12 has been made fast to the wheel W by the means 17, as above described, so that the center 12 is, in effect, a part of the wheel W except that its peripheral flange 21 is eccentric thereto, the wheel 13 is located in what I will term an "up" position, that is so that it is eccentric to the wheel W in the same direction as the center 12 and both in a direction where the axle of the wheel W is as low as possible relative to the rim 40 of the wheel 13. The operator then engages the head 64 with a suitable tool, say for instance a wrench, and by rotating it operates the pinion 60 so that the gear and pinion cooperate, causing relative movement between the center 12 and the wheel 13. With the tire T flat on the ground there is marked resistance to rotation of the wheel 13 and, if necessary, a block or the like can be located to prevent the wheel 13 from rolling on the ground G. However, the wheel W is allowed to be free and as the pinion and gear cooperate the wheel W turns and after a very slight rotation the vehicle is lifted to relieve pressure from the tire T and the wheel W turns freely. The operation of the gear and pinion is continued until the hole 83 of the lock means is in register with the socket 81, at which time the eccentricity of the wheel 13 and of the center 12 causes the rim 40 of the wheel 13 to be concentric with the wheel W of the vehicle. When the lock pin 82 is engaged or arranged in place the structure is locked and the vehicle can be operated in a limited manner on the rim 40 of the wheel 13.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An attachment for a vertical wheel including, a center section, means for attaching said section to the wheel, said section having a part eccentric to the wheel when the section is attached thereto, and a wheel section rotatably supported on said part and having a periphery concentric with the wheel when the wheel section is in a predetermined rotative position relative to the center section.

2. An attachment for a vehicle wheel including, a center section, means for attaching said section to the wheel, said section having a part eccentric to the wheel when the section is attached thereto, and a wheel section rotatably supported on said part by a portion eccentric to the periphery of the wheel section.

3. An attachment for a vehicle wheel including, two sections one a center section the other a wheel section, means for attaching the center section to the wheel, means rotatably supporting the wheel section on the center section eccentric thereto, the wheel section having a peripheral portion concentric with the wheel when the wheel section is in a predetermined rotative position relative to the center section, means operable to turn the sections relative to each other, and means for locking the sections against relative movement.

4. An attachment for a vehicle wheel including, a center section, means for attaching said section to the wheel, said section having a part eccentric to the wheel when the section is attached thereto, a wheel section rotatably supported on said part by a portion eccentric to the periphery of the wheel section, and means operable to turn the sections relative to each other.

5. An attachment for a vehicle wheel including, two sections one a center section having an eccentric part the other a wheel section, means rotatably supporting the wheel section on the center section eccentric thereto, the wheel section having a periphery concentric with the wheel when the wheel section is in a predetermined rotative position relative to the center section and gear means operable to turn the sections relative to each other to bring the wheel section to said position.

6. An attachment for a vehicle wheel including, a center section, means for attaching said section to the wheel, said section having a part eccentric to the wheel when the section is attached thereto, a wheel section rotatably supported on said part by a portion eccentric to the periphery of the wheel section, and gear means operable to turn the sections relative to each other.

7. An attachment for a vehicle wheel including, a center section, means for attaching said section to the wheel, said section having a part eccentric to the wheel when the section is attached thereto, a wheel section rotatably supported on said part by a portion eccentric to the periphery of the wheel section, and means operable to turn the sections relative to each other including a pinion carried by the wheel section meshing with a gear carried by the center section.

8. An attachment for a vehicle wheel including, a center section, means for attaching said section to the wheel, said section having a peripheral part eccentric to the wheel when the section is attached thereto, and a wheel section rotatably supported on said part and having a peripheral portion concentric with the wheel when the wheel section is in a predetermined rotative position on the center section.

9. An attachment for a vehicle wheel including a center section with a round peripheral flange, means for securing said section to the wheel with said flange eccentric to the wheel, a wheel section having a rim and a bearing part eccentric to the rim and rotatably supported by the flange, and means operable to rotate the sections relative to each other.

10. An attachment for a vehicle wheel including a center section with a round peripheral flange, means for securing said section to the wheel with said flange eccentric to the wheel, a wheel section having a rim and a bearing part eccentric to the rim and rotatably supported by the flange, means operable to rotate the sections relative to each other, and means for locking the sections against relative rotation.

11. An attachment for a vehicle wheel including a center section with a round peripheral flange, means for securing said section to the wheel with said flange eccentric to the wheel, a wheel section having a rim and a bearing part eccentric to the rim and rotatably supported by the flange, and means operable to rotate the sections relative to each other including a pinion carried by one section engaging a gear carried by the other section.

12. An attachment for a vehicle wheel including a center section with a round peripheral flange, means for securing said section to the wheel with said flange eccentric to the wheel, a wheel section having a rim and a bearing part eccentric to the rim and rotatably supported by the flange, and means operable to rotate the sections relative to each other including a pinion carried by the wheel section engaging a gear carried by the center section.

13. An attachment for a vehicle wheel including a center section with a round peripheral flange, means for securing said section to the wheel with said flange eccentric to the wheel, a wheel section having a rim and a bearing part eccentric to the rim and rotatably supported by the flange, and means operable to rotate the sections relative to each other including a pinion carried by the wheel section engaging a gear carried by the center section concentric with said flange.

14. An attachment for a vehicle wheel including, two sections one a center section the other a wheel section, means for attaching the center section to the wheel, means rotatably supporting the wheel section on the center section eccentric thereto and having a periphery concentric with the wheel when the wheel section is in a predetermined rotative position relative to the center section, means operable to turn the sections relative to each other to bring the wheel section to said position, and ratchet means checking rotation of the wheel section against rotation in one direction around the center section.

15. An attachment for a vehicle wheel including, two sections one a center section the other a wheel section, means for attaching the center section to the wheel, means rotatably supporting the wheel section on the center section eccentric thereto and having a periphery concentric with the wheel when the wheel section is in a predetermined rotative position relative to the center section, means operable to turn the sections relative to each other to bring the wheel section to said position, ratchet means checking rotation of the wheel section against rotation in one direction around the center section, and means for locking said sections against rotation with the wheel section in said position.

16. An attachment for a vehicle wheel including, a center section, means for attaching said section to the wheel, said section having a part eccentric to the wheel when the section is attached thereto, a wheel section rotatably supported on said part by a portion eccentric to the periphery of the wheel section and having a peripheral portion concentric with the wheel when the wheel section is in a predetermined rotative position relative to the center section, ratchet means checking rotation of the wheel section against rotation in one direction around the center section, and means for locking said sections against rotation with the wheel section in said position.

17. An attachment for a vehicle wheel including, two sections one a center section the other a wheel section, means for attaching the center section to the wheel, means rotatably supporting the wheel section on the center section on an axis parallel with and eccentric to the axis of the vehicle wheel and having a periphery concentric with the axis of the vehicle wheel when the wheel section is in a predetermined rotative position relative to the center section, and means operable to turn the sections relative to each other to bring the wheel section to said predetermined position.

EDWARD CRAIG.

REFERENCES CITED

The following references are of record in the file of this patent:

UNITED STATES PATENTS

| Number | Name | Date |
| --- | --- | --- |
| 899,056 | Kenshole | Sept. 22, 1908 |
| 899,954 | Cloyd | Sept. 29, 1908 |
| 1,158,735 | Skinner | Nov. 2, 1915 |
| 2,035,822 | Moody | Mar. 31, 1936 |

FOREIGN PATENTS

| Number | Country | Date |
| --- | --- | --- |
| 403,006 | Great Britain | Dec. 14, 1933 |